Jan. 24, 1967  A. MOTSCH  3,300,007
DISK CLUTCH PARTICULARLY FOR MOTOR VEHICLES
Filed Nov. 12, 1964
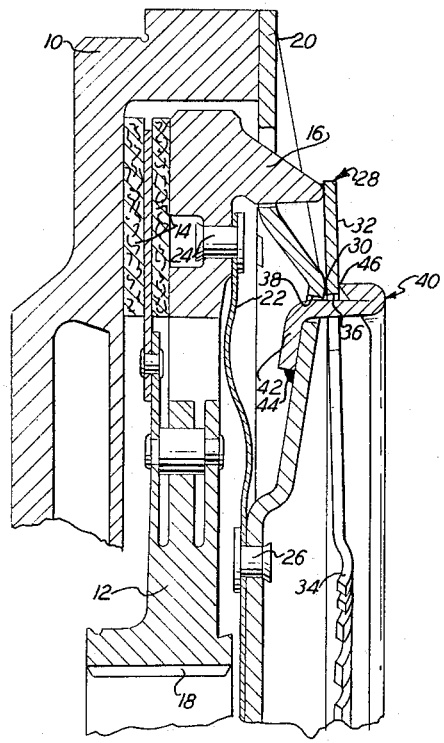
ALFONS MOTSCH
INVENTOR
BY John R. Faulkner
Clifford L. Sadler
ATTORNEYS 3,300,007
DISK CLUTCH PARTICULARLY FOR MOTOR
VEHICLES
Alfons Motsch, Cologne-Nippes, Germany, assignor to
Ford Motor Company, Dearborn, Mich., a corporation of Delaware
Filed Nov. 12, 1964, Ser. No. 410,613
Claims priority, application Germany, Jan. 16, 1964,
F 41,760
1 Claim. (Cl. 192—68)

The present invention relates generally to vehicle clutches, and more particularly to vehicle clutches of the type having a Belleville type disk spring that urges the pressure plate into engagement with the clutch disk.

One object of the invention is to provide a sure and steady centering device for the clutch pressure plate and the Belleville spring which avoids centrifugal unbalance, whereby silent operation is effected. Simultaneously, the so-called dead clutch travel at the inner ends of the tongues of the disk spring is substantially reduced by supporting the disk spring at its pivot or fulcrum free from clearance. The device, according to the present invention, that is used for centering and supporting the disk spring enables a space saving arrangement as well as easy and cheap manufacturing.

With reference to the centering of the disk spring, it is old to connect the disk spring at its outer periphery with the clutch cover by means of bolts. This connection can not be rigid and free from clearance because of the necessary movement of the disk spring, therefore, proper centering is not guaranteed. Furthermore, it is known to connect the disk spring at its outer periphery to a clutch cover and to the clutch pressure plate by resilient connection means. This connection means is rigidly fastened to the clutch cover as well as to the disk spring. Therefore, the resilient connection means must transmit the forces acting against centrifugal unbalance as well as the total axial force between the clutch pressure plate and the disk spring. This combined stress makes it necessary to use comparatively expensive resilient material.

The present invention avoids the disadvantages of the prior art in a surprisingly simple and cheap way. According to this invention, it is proposed to connect the clutch pressure plate to the clutch cover by means of a centrically corrugated disk. This corrugated disk has high radial stiffness and may be solid or perforated. The clutch thrust spring is of the disk spring or Belleville type and is centered by a clamping ring that extends through apertures in the clutch cover and the spring.

The objects and advantages of the present invention will be more thoroughly understood when considered in connection with the following detailed description and the accompanying drawing.

The single figure of the drawing shows a sectional view of a part of a clutch constructed according to the present invention.

The drawing shows a flywheel 10 and a clutch disk 12 carrying friction material 14 and supported between the flywheel 10 and a clutch pressure plate 16. Hub 18 of the clutch disk 12 is splined to the front end of the transmission gear shaft (not shown). The clutch plate or cover 20 may be fastened to the flywheel 10 by bolts in a conventional fashion. The bolts may project through bores provided in the outer periphery of the clutch cover 20.

The clutch pressure plate 16 is connected to the clutch cover 20 by a concentrically corrugated disk 22 of high radial stiffness by means of rivets 24 and 26. Although the disk 22 is radially stiff, it is flexible in an axial direction.

A disk spring 28 rests on a pivot support 30 stamped out of the clutch cover 20. Spring 28 is a spring of the Belleville type having an annular outer edge 32 with a series of circumferentially spaced, inwardly directed tongues 34. The tongues 34 are engaged by the clutch release bearing (not shown). When the bearing is moved to the left, the spring 28 tends to flatten out and to release the spring force which presses the clutch pressure plate 16 into contact with the friction material 14 of clutch disk 12 and the friction material into contact with the flywheel 10.

A series of apertures 36 are provided at the base of the tongues 34 in alignment with openings 38 in the clutch cover 20. An annular clamping ring 40 secures the Belleville spring 28 to the clutch cover 20. Ring 40 is provided with a series of circumferentially spaced tongues 42 that extend inwardly through the openings 36 and 38 of the spring 28 and the clutch cover 20. The tongues 42 are bent over to lie along the inner surface of the cover 20. The ends may be welded, as at 44, to the cover 20 if desired.

The opposite annular end of the clampinng ring 40 is bent over 180° and its edge is beveled to provide a fulcrum 46 that engages the disk spring 28. The dimension between the fulcrum 46 of ring 40 and the pivot support 30 of clutch cover 20 is equal to the thickness of the spring 28.

The above-described embodiment of the invention provides the advantage that the so-called dead clutch travel at the disk spring tongues 34 is substantially reduced. To avoid this dead clutch travel, it is necessary to support the disk spring 28 between the supporting points 30 and 46 as free from clearance as possible. This is performed by the described fastening means for the clamping ring 40 which provides tension in the axial direction. In the present case, this tension is advantageously achieved by bending the tongues 42 and welding at 44.

The foregoing description constitutes the presently preferred embodiment of this invention. Alterations and modifications may occur to those skilled in the art that will come within the scope and spirit of the following claim.

What is claimed is:
A clutch assembly having a pressure plate,
a cover plate,
means connecting said plates constructed for axial movement of said pressure plate with respect to said cover plate while maintaining said plates in coaxial relationship,
said means comprising a disk connected to said plates and having a series of radially spaced apart circumferential corrugations,
a disk type spring having a circumferential band with a series of circumferentially spaced apart tongues extending radially inwardly therefrom,
said cover plate being contoured to provide a fulcrum edge for said spring near the inner edge of said band,
said cover plate being disposed between said pressure plate and said spring,
said cover plate having at least one aperture and said pressure plate having a protruding portion extending through said aperture,
said spring pressing against said protruding portion of said pressure plate near the outer edge of said spring,
a clamping ring having a series of tongues extending through both said spring and said cover plate,
said clamping ring tongues being bent over to engage said cover plate,
said ring having a folded over fulcrum edge engaging said spring in axial alignment with the fulcrum edge of said cover plate, the distance between the two fulcrum edges being substantially equal to the thickness of said disk spring.

References Cited by the Examiner
UNITED STATES PATENTS 1,874,268 8/1932 Fink _____ 192—99 X
2,211,192 8/1932 Wolfram _____ 192—68

FOREIGN PATENTS 1,319,636 1/1963 France.
865,948 4/1961 Great Britain.

DAVID J. WILLIAMOWSKY, *Primary Examiner.*
A. T. McKEON, *Assistant Examiner.*